United States Patent

[11] 3,536,143

| [72] | Inventor | Abraham W. Hiebert<br>Box 78, Homewood, Manitoba, Canada |
|------|----------|-----------------------------------------------------------|
| [21] | Appl. No. | 648,128 |
| [22] | Filed | June 22, 1967 |
| [45] | Patented | Oct. 27, 1970 |

[54] HARROW DRAW BAR
2 Claims, 9 Drawing Figs.

[52] U.S. Cl.................................................. 172/311,
172/456, 172/452, 172/457, 172/629
[51] Int. Cl........................................................ A01b 19/04
[50] Field of Search........................................... 172/310,
311, 456, 629, 418, 482, 483, 485, 488, 489, 400,
403, 413, 422, 452, 423, 395, 397, 398, 494, 669,
674, 675, 676; 56/385, 386

[56] References Cited
UNITED STATES PATENTS

| 2,974,737 | 3/1961 | Dlugosch...................... | 172/456 |
| 2,944,615 | 7/1960 | Clark............................. | 172/456 |
| 2,973,818 | 3/1961 | Marvin......................... | 172/456 |

Primary Examiner—Robert E. Pulfrey
Assistant Examiner—Walter J. Conlon
Attorney—Kent and Ade ABSTRACT: A harrow draw bar having wing sections with outer wheels offset radially from the longitudinal axis of the wing sections so that when the wing sections are rotated through 90° to raise the harrows for transporting purposes, the wing sections move upwardly with relation to the wheel axles thus increasing the clearance of the wing sections for transporting purposes.

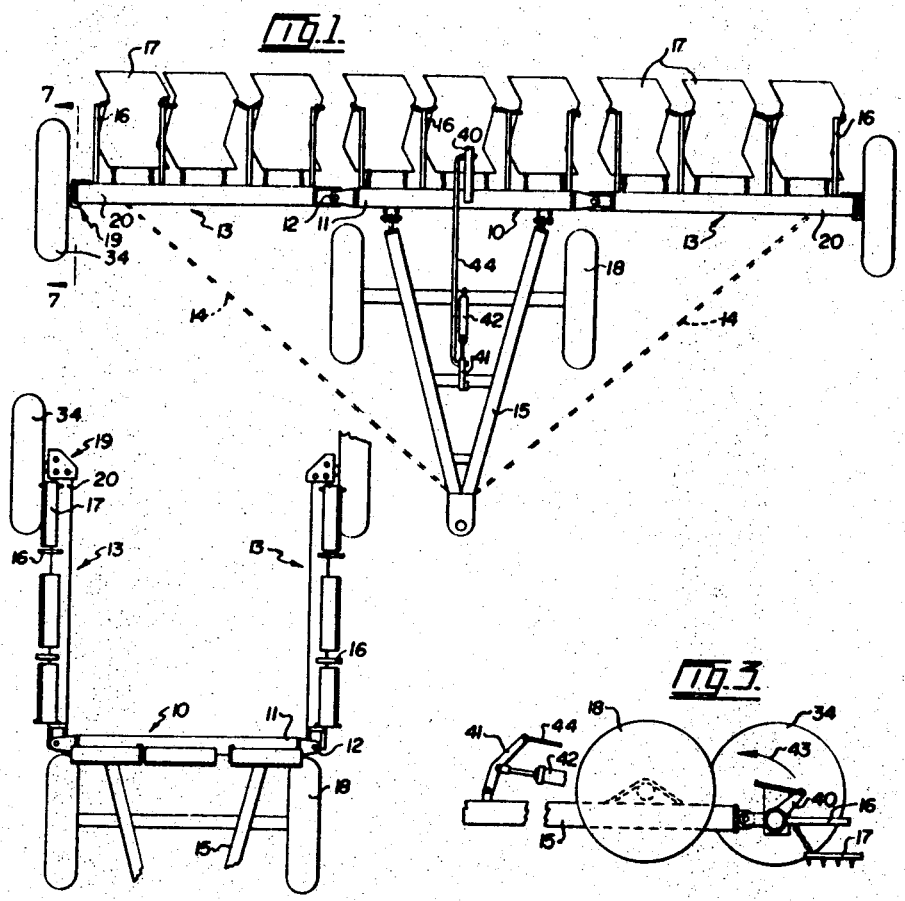

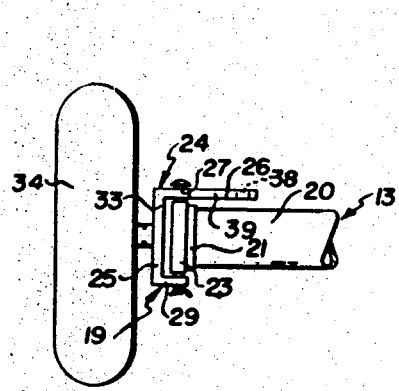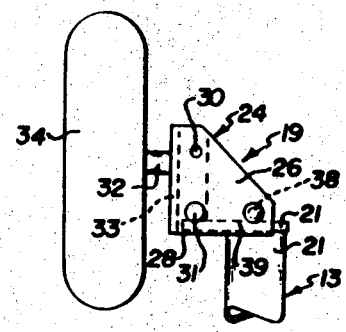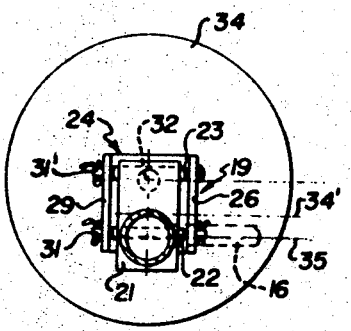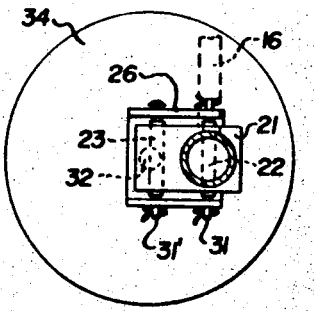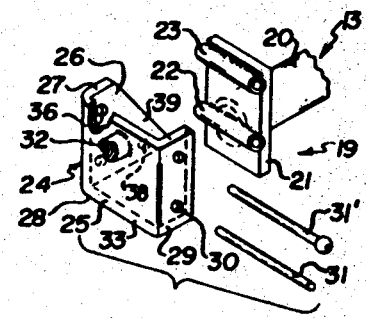

HARROW DRAW BAR

This invention relates to new and useful improvements in harrow draw bars.

The relatively long harrow draw bars used today normally include a center section and a wing section pivotally secured to each end of said center section. The center section includes a towing assembly which may be attached to a source of towing power and the center section and wing section include means for mounting conventional harrow sections for trailing therebehind.

Due to the length of present day harrow bars, the pivoted sections are usually provided with means whereby they can be pivoted from an inline position with relation to said center section, to a position at right angles thereto.

Some harrow bars include means for raising and lowering the harrow sections, but others require that they be detached and piled thereupon when the harrow draw bar is being towed from one position to another, particularly along roads or across fields which do not require harrowing.

Some harrow draw bars include means for elevating the harrow sections for the towing position, but in order to get the harrow draw bars into the lowest position for efficient harrowing, this type of draw bar readily fouls uneven ground.

I have overcome these disadvantages by providing a harrow draw bar including center and wing sections which, when raised to clear the harrows from the ground, also raises with relation to the ground.

I accomplish this by mounting the wheels supporting the wing sectons offset radially from the longitudinal axis of the center section and wing section so that when these are rotated through approximately 90° in order to raise the harrows, the wing sections and center section also move upwardly with relation to the wheel axles thus giving more clearance for towing purposes.

In conjunction with the aforementioned, I have provided a novel wheel mounting assembly for the ground engaging wheels of the wing sections which readily permit the wheels to be moved from the normal position to a position parallel with the longitudinal axis of the wing sections.

It is an object of the invention therefore to provide a device of the character herewithin described which enables the wing section and center sections of the harrow draw bar to be raised or lowered relative to the ground depending upon whether they are in the towing or working position.

Another object of the invention in conjunction with the foregoing object is to provide means on the wheel mounting assemblies which enables the wheels readily to be moved from the working position to the towing position.

A still further object of the invention is to provide a device of the character herewithin described which is simple in construction, economical in manufacture, and otherwise well suited to the purpose for which it is designed.

With the foregoing in view, and all those objects, purposes or advantages which may become apparent from consideration of this disclosure and specification, the present invention consists of the inventive concept embodied in the method, process, construction, arrangement of parts, or new use of the same, as herein particularly exemplified in one or more specific embodiments of such concept, reference being had to the accompanying FIGS. in which:

FIG. 1 is a plan view of my harrow draw bar in the working position.

FIG. 2 is a view similar to FIG. 1, but showing the device in the towing position, the towing means being eliminated in this view.

FIG. 3 is a partial side elevation showing the device in the working position.

FIG. 4 is a view similar to FIG. 3, but showing the device in the towing position.

FIG. 5 is a plan view of the wheel mounting assembly in the working position.

FIG. 6 is a view similar to FIG. 5, but showing the wheel mounting assembly in the towing position.

FIG. 7 is an enlarged sectional view along the line 7-7 of FIG. 1, and showing the device in the working position.

FIG. 8 is a view similar to FIG. 7, but showing the device in the raised or towing position prior to the wheel being turned parallel to the wing section.

FIG. 9 is an exploded isometric view of the bell crank assembly per se.

In the drawings like characters of reference indicate corresponding parts in the different FIGS.

Proceeding therefore to describe the invention in detail, reference to FIG. 1 illustrates the center section 10 which is usually tubular in construction. Pivotally secured to the ends 11 of the center section 10, by means of pins 12, are wing sections 13 which are also tubular in construction.

Dotted lines 14 illustrate the conventional linkage connections between the wing sections and the towing means 15 which maintain the longitudinal axes of the wing sections in alignment with the longitudinal axis of the center section when the device is in the working position.

Arms or bars 16 are secured to the wing sections 13 and the center section 10 and extend rearwardly therefrom, said bars carrying conventional harrow sections 17 secured thereto by chains in the conventional manner.

Ground engaging wheels 18 are mounted upon the towing section 15 adjacent the center section and support the center section and towing means together with the innermost parts of the wing sections 13.

Ground engaging wheel assemblies collectively designated 19 are mounted on the outer ends 20 of the wing sections and details of these ground engaging wheel assemblies mountings are shown in FIGS. 6 to 9 inclusive.

A mounting plate 21 is secured as by welding across the outer end 20 of the tubular wing sections 13 and a tubular bearing 22 is secured to the lower side of this mounting plate when the wing section 13 is in the working position shown in FIG. 7.

A bell crank bracket collectively designated 24 and illustrated in FIG. 9 includes a channel section or portion 25 and a crank section 26 extending substantially at right angles from one flange 27 of the channel and adjacent one end 28 thereof.

A sleeve or pin receiving means 23 is formed upon the upper side of the plate 21 also with reference to FIG. 7.

The flanges or webs 27 and 29 of the channel portion are apertured as at 30 and mount the bracket to the bearing 22 by means of pivot pin 31.

A wheel axle 32 is secured to the web 33 of the channel and extends outwardly therefrom to receive the ground engaging wheel 34 which is mounted in the conventional manner.

This pin or axle 32 is upwardly offset from the center 34' of the web 25 so that when it is mounted to the mounting plate 21 in the working position shown in FIG. 7, it will be seen that it is situated above the center line 35 of the wing section 13.

Pin receiving apertures 36 are formed in the flanges of the channel adjacent the upper end 27 thereof and a pin receiving aperture 38 is formed in the end 39 of the crank section 26.

When in the working position shown in FIG. 7, a removable pin 31' extends through the apertures 36 and through the pin receiving sleeve 23 of the mounting plate 21 thus mounting the assembly in the position shown in FIG. 7.

When it is desired to raise the harrow sections 17, the center section 10 and the wing sections 15 are partially rotated and in this connection reference should be made to FIGS. 3 and 4.

A bracket 40 is secured to the center section and extends upwardly therefrom and an actuating lever 41 is pivotally secured by the lower end thereof within the towing assembly 15.

Hydraulic piston and cylinder means 42 extend between the towing assembly and the actuating lever 41 and are connected to the source of hydraulic power within the towing means.

When the hydraulic piston and cylinder assembly is extended, the actuating lever 41 moves in the direction of arrow 42' and linkage 44, extending between the upper end of the actuating lever 41 and the upper end of the bracket or crank 40, cause the bracket or crank 40 to move in the direction of arrow 43 thus rotating the center section together with the wing sections through approximately 90°. This raises the harrow sections to a substantially vertical position, the harrow mounting arms 16 being vertical at this point.

When the wing sections 13 are rotated through approximately 90°, the offset relationship between the wheel axles 32 causes the sections 10 and 13 to take up the position shown in FIG. 8 with relation to the wheel axles thus raising the center section and wing sections several inches from the ground and giving more clearance for the towing position.

When in the position shown in FIG. 8, the pin 31' can be removed and the bell crank bracket together with the wheel can revolve through 90° around pivot pin 31 to take up the position shown in FIG. 6 whereupon the aperture 38 of the crank 26 is now in alignment with the pin receiving means 22 so that the pin 31' can now be replaced thus locking the wheel in the position shown in FIG. 6.

The wheel can therefore be moved from the normal position shown in FIG. 5 to a position parallel to the longitudinal axis of the wing section and shown in FIG. 6, it being understood that this action can only be accomplished after the wing section and center section had been rotated to the raised position shown in FIG. 8.

I claim:

1. In a foldable harrow draw bar, the combination of a center member, a pair of wing members pivoted to the ends of said center member, a wheeled towing unit connected to the center member, a set of harrow supporting arms carried by said center and wing members, actuating means reacting between said towing unit and said center member for translating said center and wing members from an operative position wherein said arms extend rearwardly to a folded position wherein said arms extend upwardly from said members, a pair of brackets secured to the outer ends of the respective wing members, a pair of stub shafts secured to the respective brackets and projecting outwardly therefrom, and a pair of ground engaging wheels rotatable on the respective stub shafts; said combination being characterized in that said stub shafts are secured to said brackets at points which are offset upwardly from the axis of said center and wing members when these members are in the operative postion, and further in that said stub shafts provide fulcrum means about which said members are translated to the folded position, whereby said members are at a higher level above ground in their folded position than in their operative position.

2. The combination as defined in claim 1 together with means adjustably securing said brackets to said wing members whereby the plane of rotation of said wheels may be selectively at right angles to and parallel with the wing members.